US011989221B2

(12) United States Patent
Samala (10) Patent No.: US 11,989,221 B2
(45) Date of Patent: May 21, 2024

(54) SYSTEMS AND METHODS FOR REMOVING NON-CONFORMING WEB TEXT

(71) Applicant: Walmart Apollo, LLC, Bentonville, AR (US)

(72) Inventor: Nitin Kishore Sai Samala, Milpitas, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 184 days.

(21) Appl. No.: 17/479,993

(22) Filed: Sep. 20, 2021

(65) Prior Publication Data
US 2023/0087738 A1    Mar. 23, 2023

(51) Int. Cl.
*G06F 16/338* (2019.01)
*G06F 16/35* (2019.01)

(52) U.S. Cl.
CPC .......... *G06F 16/338* (2019.01); *G06F 16/353* (2019.01)

(58) Field of Classification Search
CPC .... G06F 16/338; G06F 16/353; G06F 16/958; G06N 5/025; G06N 7/01; G06N 20/00
See application file for complete search history.

(56) References Cited

U.S. PATENT DOCUMENTS

| 9,105,008 B2 | 8/2015 | Popescu et al. |
| 10,176,500 B1 | 1/2019 | Mohan |
| 10,489,393 B1 * | 11/2019 | Mittal ................. G06F 16/2455 707/3 |
| 2012/0136985 A1 * | 5/2012 | Popescu ................. G06Q 50/01 709/224 |
| 2012/0330958 A1 * | 12/2012 | Xu .......................... G06F 17/16 707/738 |

(Continued)

FOREIGN PATENT DOCUMENTS

| EP | 0752676 B1 * | 11/2002 | ............. G06F 17/30 |
| WO | WO-2016035072 A2 * | 3/2016 | ............. G06Q 30/02 |

OTHER PUBLICATIONS

Cambridge Consutlants, "Use of AI in Online Content Moderation," 2019 Report produced on behalf of Ofcom, 84 pgs. 2019.

*Primary Examiner* — Yuk Ting Choi
(74) *Attorney, Agent, or Firm* — BRYAN CAVE LEIGHTON PAISNER LLP (57) ABSTRACT

Systems and methods including one or more processors and one or more non-transitory storage devices storing computing instructions configured to run on the one or more processors and perform: parsing one or more web texts; determining a respective web text sentiment score for each respective web text of the one or more web texts, as parsed; creating a ranked list of one or more match words in the one or more web texts; scoring the one or more match words in the ranked list of the one or more match words; creating a report covering a predetermined period of time using the one or more match words, as scored, in the ranked list; extracting one or more topics from the report covering the predetermined period of time; labeling the one or more match words to create labeled training data; and training a word-based classifier using the labeled training data to identify non-conforming web text submitted to a website for display, wherein the one or more web texts comprises the non-confirming web text. Other embodiments are disclosed herein.

20 Claims, 5 Drawing Sheets

(56) References Cited

U.S. PATENT DOCUMENTS

| | | | |
|---|---|---|---|
| 2014/0101119 A1* | 4/2014 | Li | G06F 16/3331 |
| | | | 707/706 |
| 2016/0162576 A1 | 6/2016 | Arino | |
| 2017/0249389 A1* | 8/2017 | Brovinsky | G06Q 30/02 |
| 2018/0060338 A1* | 3/2018 | DeLuca | G06F 16/9535 |
| 2019/0005020 A1* | 1/2019 | Gregory | G06F 18/2411 |
| | | | 707/3 |
| 2020/0134095 A1* | 4/2020 | Weldemariam | G06F 16/35 |
| 2020/0242750 A1* | 7/2020 | Kokkula | G06V 10/82 |
| 2021/0011961 A1* | 1/2021 | Guan | G06F 3/04842 |

\* cited by examiner

SYSTEMS AND METHODS FOR REMOVING NON-CONFORMING WEB TEXT

TECHNICAL FIELD

This disclosure relates generally to identifying and removing non-conforming web text, and more specifically relates to using and/or training predictive models to perform this task.

BACKGROUND

Regulation of non-conforming (e.g., inappropriate, offensive, controversial, etc.) text on websites or computer applications has become a growing problem on computer networks for a number of reasons. As one example, the sheer amount of text submitted to various websites makes manual review of the text impractical, if not impossible. While automated methods have made this review faster, they have also introduced additional problems. One automated method that has been in use is to maintain a list of non-conforming words or phrases (e.g., a gazette). When a user submits a word or phrase on the list, the submission can be automatically refused, denied visibility (e.g., shadow banned), or removed (if already posted). This list-based approach has its own limitations. First, the list-based approach is often retrospective because a word or phrase must be identified as non-conforming before it can be added to the list. This situation, then, prevents the list-based approach from proactively adapting to changing circumstances of what is non-conforming. Second, words or phrases on the list are easily identified by users who then convey the same sentiment using different words or phrases, homophones of words or phrases on the list, or some other workaround to avoid words or phrases on the list. Thirdly, the context of words or phrases can change their meaning and a binary, list based approach to removal of non-conforming words or phrases does not consider context. This issue with the shifting meaning of language can be compounded when removing non-conforming web text because many individuals can speak positively about non-conforming web text or negatively about conforming web text.

Another automated method that has been in use is training and using predictive algorithms. While using predictive algorithms to remove non-conforming web text can solve some of the above referenced problems, many data scientists and software engineers continue to encounter problems while training novel algorithms. One problem encountered when training predictive algorithms is a lack of adequate amounts of representative training data. Predictive algorithms trained on problematic training data suffer from a number of flaws. For example, predictive algorithms trained on an insufficient amount of data can be inaccurate and, depending on the content of the training data, can overpredict or underpredict outcomes, neither of which is desirable. Further, predictive algorithms trained on non-representative training data can be skewed due to a unique event in the training data. These inaccuracies can also pose problems for predictive algorithms used for removal of non-conforming text, as a severely overpredicted outcome can lead to recurring removal of conforming text.

In the past, solutions to this problem of poor or insufficient amounts of training data have been simply to (1) gather more training data, (2) purchase higher quality training data sets from a vendor, or (3) use a pre-trained model. Each of these past solutions have their own limitations. In many instances, gathering more training data can be time consuming due to the large corpus of non-conforming text needed to accurately train a predictive model. Purchasing training data can also pose problems, as these training datasets can be expensive and can become outdated quickly. The disadvantages of pre-trained models are similar to those seen with purchased training data, as pre-trained models can also be expensive when they are bespoke and can become outdated quickly without updating or re-training. Further, non-conforming text that has not been seen before by a model or that is new can be misclassified by a model (pre-trained or not) due to a lack of representation in training data (either gathered or purchased).

Therefore, there is a need for a system and method for removing web text that avoids one or more of the problems identified above.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: parsing one or more web texts; determining a respective web text sentiment score for each respective web text of the one or more web texts, as parsed; creating a ranked list of one or more match words in the one or more web texts; scoring the one or more match words in the ranked list of the one or more match words; creating a report covering a predetermined period of time using the one or more match words, as scored, in the ranked list; extracting one or more topics from the report covering the predetermined period of time; labeling the one or more match words to create labeled training data; and training a word-based classifier using the labeled training data to identify non-conforming web text submitted to a website for display, wherein the one or more web texts comprises the non-conforming web text.

Various embodiments include a method. The method can be implemented via execution of computing instructions configured to run at one or more processors and configured to be stored at non-transitory computer-readable media The method can comprise parsing one or more web texts; determining a respective web text sentiment score for each respective web text of the one or more web texts, as parsed; creating a ranked list of one or more match words in the one or more web texts; scoring the one or more match words in the ranked list of the one or more match words; creating a report covering a predetermined period of time using the one or more match words, as scored, in the ranked list; extracting one or more topics from the report covering the predetermined period of time; labeling the one or more match words to create labeled training data; and training a word-based classifier using the labeled training data to identify non-conforming web text submitted to a website for display, wherein the one or more web texts comprises the non-confirming web text.

Figure 1:
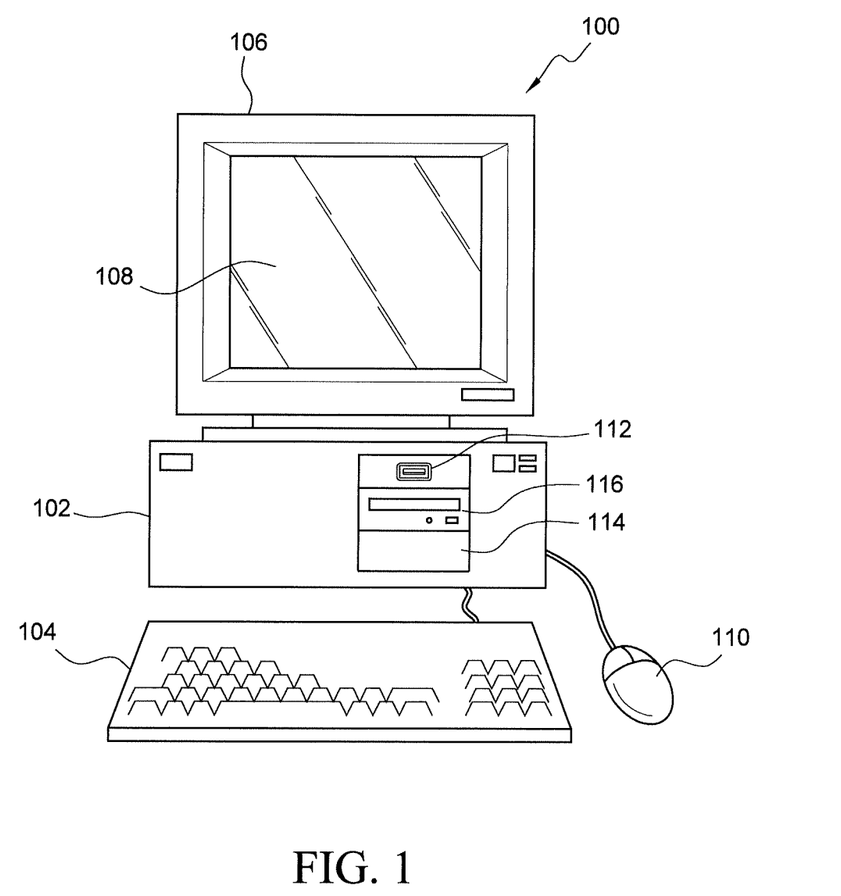
FIG. 1 illustrates a front elevational view of a computer system that is suitable for implementing various embodiments of the systems disclosed in FIGS. 3 and 5.
Figure 2:
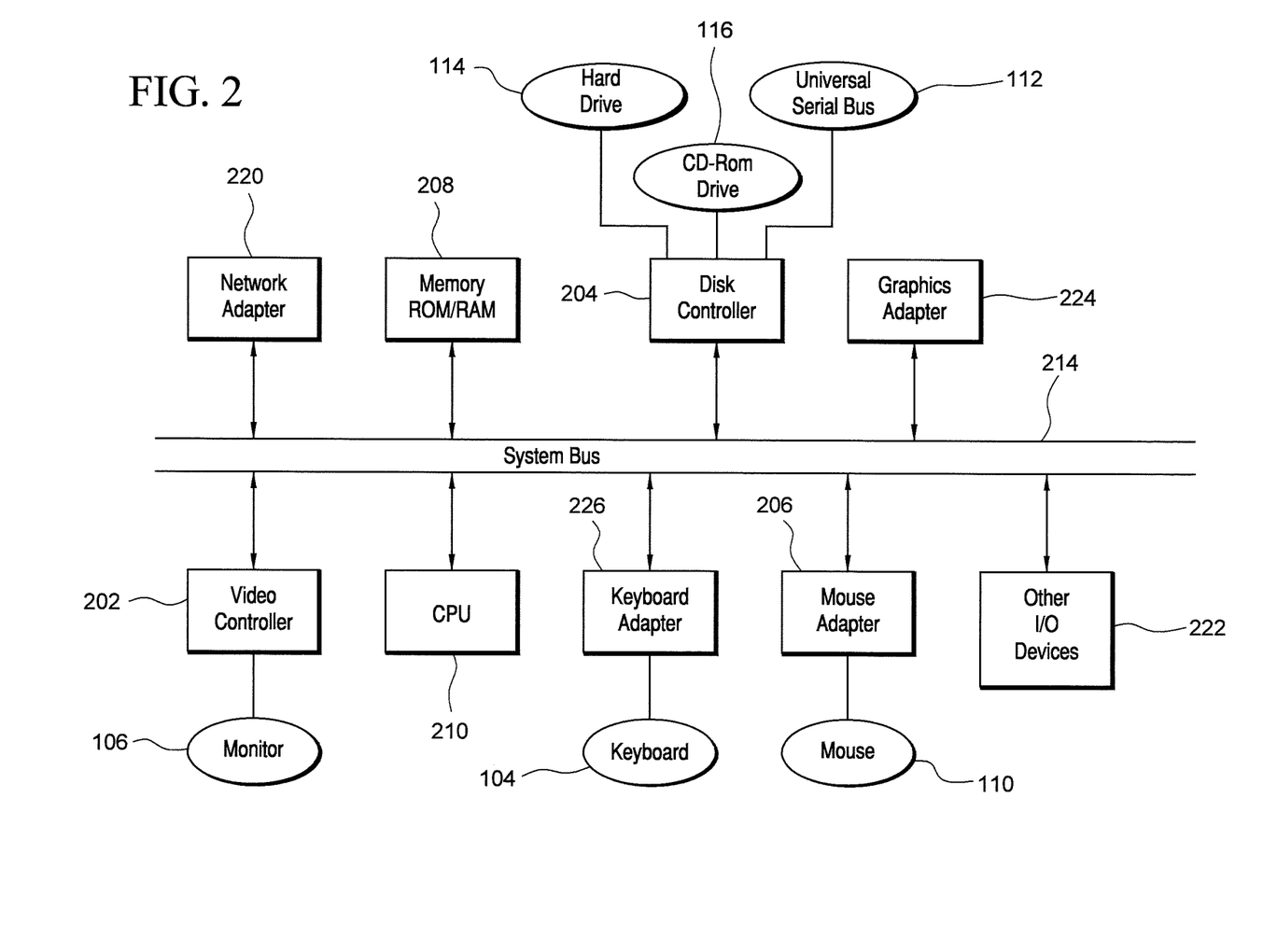
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
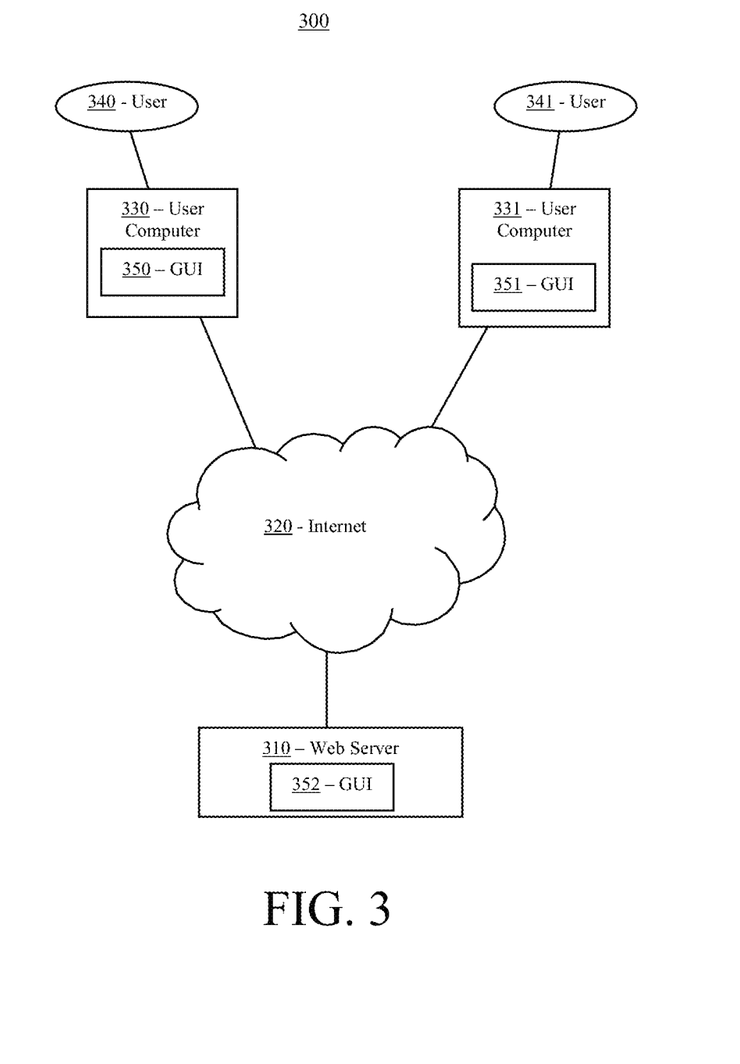
FIG. 3 illustrates a representative block diagram of a system, according to an embodiment.

Turning ahead in the drawings, FIG. 3 illustrates a block diagram of a system 300 that can be employed for removing non-conforming web text, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. In some embodiments, user computers 330, 331 can be referred to as customer computers. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In some embodiments, web server 310 can be in data communication through an internet 320 with user computers 330, 331. In various embodiments, web server 310 can host one or more websites and/or a back end for one or more eCommerce applications. For example, web server 310 can host an eCommerce website that allows users to browse and/or search for products, to add products to an electronic shopping cart, and/or to purchase products, in addition to other suitable activities. While this disclosure may refer to an eCommerce website or an eCommerce application separately, it will be understood by a person having ordinary skill in the art that an eCommerce website or an eCommerce application can be used interchangeably in this disclosure. In these or other embodiments, an eCommerce website can be configured to act as an eCommerce marketplace for third-party sellers. For example, third-party sellers can submit their own items to an operator or web server 310, who can then offer these items for sale on the eCommerce marketplace. In these embodiments, a third-party seller can submit one or more of a title for an item, a description for an item, an image of an item, etc. to an eCommerce marketplace. The eCommerce marketplace can then format the information submitted by the third-party seller for display on an eCommerce web site.

In many embodiments, internet 320 can be an intranet that is not open to the public. In further embodiments, internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, system 300 can comprise graphical user interface ("GUI") 350, 351. In the same or different embodiments, GUI 350, 351 can be part of and/or displayed by user computers 330, 331, which also can be part of system 300, and GUI 352 can be part of and/or display by web server 310. In some embodiments, GUI 350, 351, 352 can comprise text and/or graphics (image) based user interfaces. In the same or different embodiments, GUI 350, 351, 352 can comprise a heads up display ("HUD"). When GUI 350, 351, 352 comprises a HUD, GUI 350, 351, 352 can be projected onto glass or plastic, displayed in midair as a hologram, or displayed on monitor 106 (FIG. 1). In various embodiments, GUI 350, 351, 352 can be color or black and white. In many embodiments, GUI 350, 351, 352 can comprise an application running on a computer system, such as computer system 100, user computers 330, 331, and/or web server 310. In the same or different embodiments, GUI 350, 351 can comprise a website accessed through internet 320. In some embodiments, GUI 350, 351, 352 can comprise an eCommerce website. In these or other embodiments, GUI 350, 351, 352 can comprise an administrative (e.g., back end) GUI allowing an administrator to modify and/or change one or more settings in system 300. In the same or different embodiments, GUI 350, 351, 352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In many embodiments, the techniques described herein can provide a practical application and several technological improvements. In some embodiments, the techniques described herein can provide for more accurate, faster, and efficient removal of non-conforming web text submitted by a third party. These techniques described herein can provide a significant improvement over conventional approaches of removing non-conforming web text, such as manual review and removal by a human. Moreover, these techniques are technical improvements over other possible approaches, such as a rules based algorithm for web text removal, because the techniques described herein can beneficially make determinations based on dynamic information that describes current conditions and/or conditions that have occurred during the same day of web text submission. In this way, the techniques described herein can avoid problems with stale training data sets by continually updating.

In a number of embodiments, the techniques described herein can advantageously provide an improved user experience by removing non-conforming web texts before they are displayed on a website.

In many embodiments, the techniques described herein can be used continuously at a scale that cannot be reasonably performed using manual techniques or the human mind. For example, it is impractical for the human mind to manually gather and pre-process web text due to the large amount of data needed to train a classifier.

In a number of embodiments, the techniques described herein can solve a technical problem that arises only within the realm of computer networks, as non-conforming web texts classifiers do not exist outside the realm of computer networks.

Figure 4:
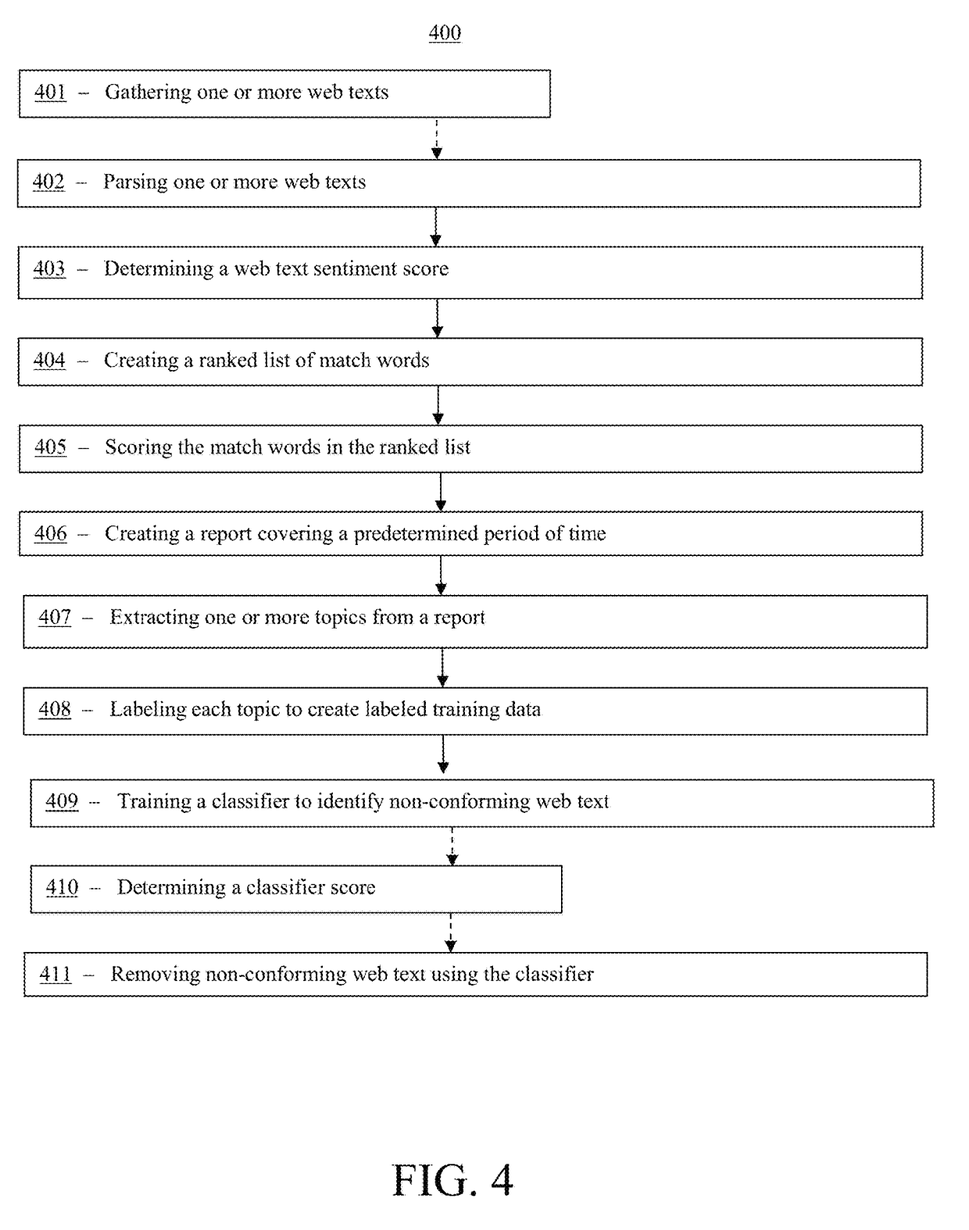
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3) and/or user computers 330, 331 (FIG. 3). The processing module(s) can be similar or identical to the processing module(s) described above with respect to computer system 100 (FIG. 1). In many embodiments, one or more activities of method 400 can be performed periodically (e.g., hourly, daily, weekly, etc.).

In some embodiments, method 400 can optionally comprise an activity 401 of gathering one or more web texts. In some embodiments, web text can comprise alphanumeric characters configured for display over a network. In these or other embodiments, web text can be displayed as text and/or displayed as or in an image. For example, web text can be all or a portion of a website, a news article, a social media post, a really simple syndication (RSS) feed, etc. In further embodiments, web text can comprise specifications and/or images of one or more items submitted to an eCommerce website. In some embodiments, web text can be gathered from time sensitive sources. For example, trending topics on a social network or RSS feeds focused on breaking news can be a source of web text. In this way, training data generated from web text gathered in activity 401 can be up to date and pertinent to current events. This up-to-date training data can then later be used to generate a predictive algorithm that more accurately identifies newly developed or unseen non-conforming text. In various embodiments, web text can be gathered by one or more web crawlers (e.g., a spider or spiderbot) that read and catalogue web text over the Internet. In many embodiments, activity 401 can be performed every day so that new web text is catalogued before it is erased.

In many embodiments, method 400 can comprise an activity 402 of parsing one or more web texts. In various embodiments, parsing one or more web texts can comprise performing a syntax analysis on the one or more web texts. In these or other embodiments, parsing a web text can comprise removing one or more characters, words, or phrases from the web text. In this way, web text can be altered in a way that makes various types of downstream analysis (e.g., sentiment analysis, frequency analysis, etc.) simpler and more accurate. For example, parsing can comprise removing stop words from the one or more web texts, removing HTML tags from the one or more web texts, removing whitespace from the one or more web texts, or removing one or more punctuation marks from the one or more web texts. As an example, a stop word can be a short function word or contraction (e.g., the, is, it's, at, which, on, etc.). In many embodiments, stop words can comprise one or more characters and/or symbols seen in previous reports (e.g., a report created in activity 406 below). In some embodiments, stop words can comprise characters outside ASCII standard. In these or other embodiments, stop words can be in a different language (e.g., not in English). In various embodiments, activity 402 can be performed by one or more parsing algorithms known in the art. For example, Beautiful Soup XML Parser (maintained at https://www.crummy.com/software/BeautifulSoup/bs4/doc/) can be used.

In many embodiments, method 400 can comprise an activity 403 of determining a respective web text sentiment score. In various embodiments, activity 403 can be performed after activities 401 and/or 402. In other embodiments, activity 403 can be performed without one or more of activities 401 and/or 402. Generally speaking, sentiment analysis can comprise a text analysis algorithm that detects polarity (e.g., a positive, negative, compound, and/or neutral sentiment) within the text whether it be a whole document, paragraph, sentence, or clause. In many embodiments, a sentiment analysis algorithm can provide insight in addition to or without polarity by classifying sentiment within one or more states (e.g., enjoyment, anger, disgust, sadness, fear, surprise, etc.), determining whether a text comprises a subjective or objective statement, an/or grading intensity (e.g., strength) of a sentiment. In these or other embodiments, a sentiment analysis algorithm can output a score for each category of sentiment (e.g., a positive, negative, compound, and/or neutral sentiment). In these embodiments, web text can be assigned the sentiment with a highest score. In embodiments where all sentiment scores are approximately zero, the associated web text can be removed from downstream analysis. In this way, a more accurate training data set can be created because web text with insufficient analyzable content can be removed from a resulting training data set. In various embodiments, a sentiment analysis algorithm can be configured to analyze social media web text. For example, the Valence Aware Dictionary for sEntiment Reasoning ("VADER") algorithm is configured to analyze social media web text. VADER is described in C. Hutto et al., VADER: A PARSIMONIOUS RULE-BASED MODEL FOR SENTIMENT ANALYSIS OF SOCIAL MEDIA TEXT, Proceedings of the Eighth International AAAI Conference on Weblogs and Social Media 216 (2014), which is herein incorporated by this reference in its entirety.

In many embodiments, method 400 can comprise an activity 404 of creating a ranked list of one or more match words. In various embodiments, a ranked list of one or more match words can be created from one or more web texts described in one or more of activities 401-403. In some embodiments, web texts whose sentiment scores are approximately zero can be excluded from activity 404. In this way, a more accurate training data set can be created because web text with insufficient analyzable content can be removed from a resulting training data set. In various embodiments, a match word can comprise one or more prominent terms extracted from web text. For example, web text comprising a news article about surfing in Hawaii would likely have match words comprising "surf" and "Hawaii." In this way, a match word can act as a stand-in and/or an approximation for one or more topics, subjects, and/or themes in web text. In some embodiments, a match word described herein can be paired with web texts from which it was extracted. For example, a match word of surf can be paired with articles about Hawaii and San Diego (another popular surfing location). In various embodiments, match words in web text can be ranked based on their frequency of use. In some embodiments, match words can be ranked by a number of mentions. In these or other embodiments, match words can be ranked within a single piece of web text or groupings of web text (e.g., for a specific RSS feed, a specific social media network, a specific user or group of users, a specific news author or reporter, etc.). In these or other embodiments, a match work can function as a key configured to map between one or more reports (e.g., a report created in activity 406 below).

In many embodiments, web text can be further processed before and/or as a part of activity 404. For example, the one or more web texts can be parsed as described in activity 402. As another example, one or more words in a web text can be stemmed using a stemming algorithm. Generally speaking, a stemming algorithm can be configured to reduce inflected and/or derived words to their base stem. For example, a stemming algorithm would reduce the inflected present participle form "running" to the base stem "run." Stemming algorithms can operate in a number of different fashions. For example, some stemming algorithms look up an inflected or derived form of a stem in a lookup table that connects the inflected or derived form with the stem. As another example, some stemming algorithms use rules that ingest an inflected or derived form of a stem, apply one or more rules, and then output the stem. In some embodiments, the one or more rules can be configured to strip an inflected or derived form of a stem of a suffix to create the stem. For example, the past tense form "golfed" can be stripped of an "-ed" suffix to produce a stem of "golf." As a third example, some stemming algorithms use a probabilistic approach to identify a stem of an inflected or derived form. In some embodiments, a probabilistic approach can comprise a predictive model, a machine learning model (either trained or untrained), and/or a neural network. In many embodiments, a hybrid approach using one or more different stemming algorithms can be used. In various embodiments, a hybrid stemming algorithm can produce a more accurate stem for a word than using only one stemming algorithm because weakness in a single stemming algorithm can be complemented by strengths of a different stemming algorithm. In many embodiments, a PorterStemmer algorithm, which is maintained at https://tartarus.org/martin/PorterStemmer/, can be used to extract stems from web text.

In many embodiments, a lemmatization algorithm can be applied to web text before and/or at the same time as a stemming algorithm. Generally speaking, a lemmatization algorithm can be configured to identify a word's lemma (e.g., its canonical form, dictionary form, and/or citation form). For example, "break", "breaks," "broke," "broken" and "breaking" are all forms of the lemma "break." In many embodiments, a lemma can be the same or different than a stem. For example, a stem for "better" would be "bet," but a lemma for "better" would be "good." While a lemmatization algorithm can be very similar to a stemming algorithm, many lemmatization algorithms identify lemma by using a context of a word within web text. For example, some lemmatization algorithms can be configured to identify a part of speech (e.g., noun, verb, adverb, adjective, etc.) for a word in web text. In many embodiments, a lemmatization algorithm can proceed by performing a dictionary lookup of a word to determine one or more of its part of speech or its lemma. In many embodiments, a lemmatization algorithm can be combined with a stemming algorithm to produce a more accurate list of match words.

In many embodiments, a named entity recognition algorithm can be applied to web text before and/or at the same time as a stemming algorithm and/or a lemmatization algorithm. Generally speaking, a named entity recognition algorithm can be configured to locate and classify named entities mentioned in web text into pre-defined categories such as person names, organizations, locations, medical codes, time expressions, quantities, monetary values, percentages, etc. Named entity recognition algorithms can proceed in a number of different ways. For example, a named entity recognition algorithm can use a lookup table of entities, a linguistic grammar rules based approach, and/or a probabilistic model to identify a named entity. In various embodiments, the spaCy algorithm, maintained at http://www.spacy.io, can be used to extract named entities from web text.

In many embodiments, method 400 can comprise an activity 405 of scoring one or more match words. In some embodiments, one or more match words in a ranked list of match words can be scored. In these or other embodiments, only a certain number of top ranked match words (e.g., a top ten, a top five) can be scored. In various embodiments, match words having a minimum number of mentions and/or a minimum frequency can be scored. In some embodiments, a match word score can be calculated using a mention weight. In further embodiments, a mention weight can be calculated using a frequency of a match word. In various embodiments, a frequency can be aggregated over a predetermined period of time (e.g., hourly, daily, weekly, etc.). For example, in an embodiment where a first match word is mentioned more than a second match word over a one day time period, the first match word has a higher mention weight than the second match word, but this may also change when the time period is extended or contracted. In further embodiments, before calculating a match word score, a mention weight can be normalized across a predetermined time period. For example, a frequency of a match word across a two week period can be normalized such that a match word weights across the two week period can be summed to one. In some embodiments, before calculating a match word score, a sentiment score of a match word can be modified in one or more of a number of ways. For example, a compound sentiment score (e.g., a resolution of negative, neutral and positive score of the web text containing the match word) can be calculated and used to create a match word score. In these or other embodiments, a match word score can be calculated by multiplying a mention weight for a match word by a sentiment score for the match word. In various embodiments, a match word score can be calculated for a specific time period. For example, a match word score can be calculated on a daily basis by multiplying a compound sentiment score for that day by a normalized mention weight for that day. A number of these daily scores can then be calculated and compared, thereby allowing a system to compile an understanding of how a match word changes as time progresses.

In many embodiments, method 400 can comprise an activity 406 of creating a report. In some embodiments, a report can be created using one or more match words. In various embodiments, one or more activities 402-406 can be performed on a weekly or greater basis to detect trends in scores for one or more match words. In many embodiments, a report can be generated for a top number of match words ranked by a score, as described in activity 405. In some embodiments, a report can comprise text file that allows data to be saved in a structured format. For example, a report can comprise a CSV file. In some embodiments, each web text analyzed above can have its own row in a report. In these or other embodiments, a report can comprise one or more columns containing one or more of a title of web texts analyzed in the report, summary of web text of web texts analyzed in the report, one or more sentiment scores of web texts analyzed in the report, one or more frequency scores of web texts analyzed in the report, and/or one or more match word scores of web texts analyzed in the report. In many embodiments, rows of a report can be filtered and/or ranked based on one or more one or more frequency scores of web texts analyzed in the report and/or one or more match word scores of web texts analyzed in the report. In many embodiments, a report can also comprise one or more columns indicating subsets (e.g., days) within a larger time period (e.g., two weeks) where (e.g., in what web text) a match word occurred and also a column displaying how many web texts the match word occurred in each subset. In this way, a report can indicate which web texts to focus on for trending match words that are likely to be associated with non-conforming web text. A report can be used in a number of ways in method 400, as described in further detail below.

In many embodiments, method 400 can optionally comprise an activity 407 of extracting one or more topics from a report. In some embodiments, activity 407 can be performed at the same time and/or as a part of one or more of activities 408-409. Generally speaking, a topic in a report can be described as one or more words that can represent a central theme and/or subject of one or more web texts. Many different topic modeling algorithms can be used together and/or separately to determine a topic in a report. Some topic models can use a frequency of one or more words as an approximation of a topic. For example, "dog" and "bone" will appear more often in documents about dogs, "cat" and "meow" will appear in documents about cats, and "the" and "is" will appear approximately equally in both. In various embodiments, a term frequency-inverse document frequency ("tf-idf") algorithm can be used to extract one or more topics from a report. Generally speaking, a tf-idf algorithm outputs a numerical statistic that is intended to reflect how important a word is to a document in a collection or corpus. In some embodiments, a tf-idf value can increase proportionally to a number of times a word appears in a report and is offset by the number of web texts in a corpus used to create the report that contain the word. In various embodiments, a tf-idf score can be calculated by multiplying a term frequency term and inverse document frequency term together. In some embodiments, a tf-idf algorithm can be used to turn a report into one or more unlabeled features. For example, a tf-idf score can be computed for one or more words in the report. These tf-idf scores can then be concatenated into one or more vectors that represents the report and can be used as a feature in various predictive algorithms.

In many embodiments, a non-negative matrix factorization ("NMF") algorithm can be used to generate one or more topics. Generally speaking, an NMF algorithm decomposes (e.g., factorizes) high-dimensional vectors into one or more lower-dimensional representations. These lower dimensional representations can then be used to identify a topic in a report as well as its significance within the report. In some embodiments, an NMF algorithm can start by considering a matrix comprising one or more vectors. In some embodiments, a matrix V can comprise vectors generated from a report (e.g., via a tf-idf algorithm). In these or other embodiments, a NMF algorithm can proceed by decomposing a matrix V into a matrix W and a matrix H. In these embodiments, the matrix W can contain vectors representing topics while the matrix H can contain vectors representing weights for those topics. In various embodiments, a topic having a highest weight can be identified as a topic of a report. In these or other embodiments, a report can have more than one topic. For example, a top n number of topics ranked by their weights can be considered a topic of a report. More information about implementation of an NMF algorithm can be found in Kuang et al., PARTITIONAL CLUSTERING ALGORITHMS, 215-243 (2015), which is incorporated by this reference in its entirety.

In many embodiments, a latent Dirichlet allocation ("LDA") algorithm can be used to generate one or more topics. Generally speaking, an LDA algorithm can comprise a statistical model that allows sets of observations to be explained by unobserved groups, thereby explaining why some parts of the data are similar. For example, if observations are words collected into a report, an LDA algorithm posits that each report is a mixture of a number of topics and that each word's presence is attributable to one of the report's topics. In many embodiments, an LDA algorithm can begin by randomly assigning each word in a report to one of k topics. In these embodiments, k can be chosen beforehand. In various embodiments, an LDA algorithm can continue by calculating, for each word w in each report d, a proportion of words in report d that are assigned to topic t (e.g., calculate p(topic t|report d)). In this way, an LDA algorithm can capture how many words belong to a topic t for a given report d. In some embodiments, an LDA algorithm can proceed by calculating a proportion of assignments to topic t over all reports that come from a word w (e.g., calculate p(word w|topic t)). In this way, an LDA algorithm can describe how many reports are in topic t because of word w. In these or other embodiments, an LDA algorithm can continue by updating (or generating if it has not previously been calculated) a probability for a word w belonging to a topic t, as p(word w with topic t)=p(topic t|report d)*p(word w|topic t). In many embodiments, an LDA algorithm can repeat these steps until the probability no longer changes.

In many embodiments, method 400 can optionally comprise an activity 408 of creating a new rule. In some embodiments, activity 408 can be performed at the same time and/or as a part of one or more of activities 407 or 409. Generally speaking, a rule can comprise an automated rule for configured to identify of non-conforming web text. In various embodiments, a rule can comprise a search query configured to return non-conforming web text. For example, a rule can comprise an SQL rule configured to filter out non-conforming web text. In some embodiments, a while list of phrases can be created for overriding a rule. For example, "gun" can be considered non-conforming, but "Top Gun" is a movie that can be conforming. In this example, a rule could be generated that labels the term "gun" as non-conforming and the term "Top Gun" can be white listed as always conforming. In various embodiments, a rule can comprise a list of one or more words, topics, and/or phrases identified as non-conforming. In these or other embodiments, one or more words, topics, and/or phrases identified as non-conforming can comprise topics extracted from a report (e.g., in activity 407). In many embodiments, one or more words, topics, and/or phrases can be identified as non-conforming by looking at a match word score for the one or more words, topics, and/or phrases. In these embodiments, one or more words, topics, and/or phrases can be identified as non-conforming when the match word score is above or below a predetermined threshold. In various embodiments, creating a new rule can comprise modifying an old rule to create a new rule. In further embodiments, creating a new rule can comprise generating a rule de novo. In many embodiments, a new rule can be generated by one or more analysts reviewing topics generated in activity 407.

In many embodiments, method 400 can comprise an activity 409 of labeling each match word. A match word can be labeled in a number of different ways. For example, a match word can be labeled as conforming or non-conforming, with a specific sentiment (e.g., a positive, negative, compound, and/or neutral sentiment), with a sentiment score, a match word, and/or a category (e.g., politics, current events, etc.). In these or other embodiments, a match word and it's paired web text can be labeled in activity 409. In some embodiments, labels are applied manually by a human (e.g., via crowdsourcing). In these or other embodiments, labels can be applied by an automated labeling algorithm. Generally speaking, automated labeling algorithms are a form of machine learning that uses weak supervision (e.g., semi-supervised learning) to produce a labeled (e.g., training) dataset using noisy, limited, or imprecise input sources. The resulting labels can be known as weak labels, and, while possibly inaccurate, these weak labels can provide the baseline for training a strong predictive model.

In many embodiments, an automated labeling algorithm can comprise a labeling function. Generally speaking, a labeling function can take as input a data point (e.g., a match word) and either assign a label to it or abstain from assigning a label to it. In many embodiments, an automated labeling algorithm can incorporate multiple labeling functions. In these or other embodiments, different labeling functions can overlap (e.g., label the same data point) and/or conflict (e.g., assign different labels to the same data point). Labeling functions can proceed in a number of different ways. For example, a labeling function can use a generative model, a low-density separation algorithm, and/or a heuristic approach. In many embodiments, a generative model can be configured to determine a distribution of each label among data points. In some embodiments, a generative model can assume a distribution of data points before assigning labels. For example, a generative model can assume that data points comprise a Bayesian distribution, a Bernoulli distribution, a uniform distribution, a multimodal distribution, a Poisson distribution, an exponential distribution, etc. In various embodiments, a low-density separation algorithm can attempt to define boundaries between labels in data sets. A number of methods are suitable for low-density separation labeling are available. For example, Gaussian process models, information regularization, and entropy minimization can be used as low-density separation algorithms. In these or other embodiments, a heuristic approach can be configured to label data points using one or more rules. For example, a heuristic approach can use a keyword search. In some embodiments, previously generated and/or updated rules for removing non-conforming web text can be used as labeling functions. For example, if a rule identifies a match word as non-conforming, then that match word can be labeled as such, thereby creating a training data point. In many embodiments, method 400 can comprise an activity 410 of training a classifier to identify non-conforming web text. In many embodiments, a classifier can be configured to classify web text as conforming and/or non-conforming. In these or other embodiments, a classifier can be configured to determine a label for one or more web texts. In some embodiments, a classifier can determine whether web text is conforming/non-conforming and/or in a specific label by determining a probability that the web text is conforming/non-conforming and/or in a specific label. In these embodiments, a classifier can classify the web text when the probability is above or below a predetermined threshold (depending on the classification).

In some embodiments, training a classifier can comprise estimating internal parameters of a model configured to classify web text as described above. In various embodiments, a predictive algorithm (e.g., a classifier) can be trained using labeled training data, otherwise known as a training dataset. In many embodiments, a training dataset can comprise labeled match word data as described in activity 409. In this way, a machine learning algorithm can be configured to identify conforming/non-conforming we text and/or in apply a specific label to the web text. In the same or different embodiments, a machine learning algorithm can comprise a classifier. For example, the Bidirectional Encoder Representations from Transformers (BERT) algorithm can be used. In the same or different embodiments, a pre-trained machine learning algorithm can be used, and the pre-trained algorithm can be re-trained on the labeled training data. In some embodiments, the machine learning model can also consider both historical and dynamic input from match words generated in activity 405 and/or topics generated in activity 407. In this way, a machine learning algorithm can be trained iteratively as new match words and/or topics are added. In many embodiments, a machine learning algorithm can be iteratively trained in real time as data is added to a training data set. In various embodiments, a machine learning algorithm can be trained, at least in part, on a single user's (e.g., user 340 (FIG. 3)) submitted web text or the single user's submitted web text can be weighted in a training data set. In this way, a predictive algorithm tailored to a single user can be generated. In the same or different embodiments, a predictive algorithm tailored to a single user can be used as a pre-trained algorithm for a similar user. In several embodiments, due to a large amount of data needed to create and maintain a training data set, a predictive model can use extensive data inputs to determine whether web text is conforming/non-conforming and/or in a specific label. Due to these extensive data inputs, in many embodiments, creating, training, and/or using a predictive algorithm configured to determine whether web text is conforming/non-conforming and/or in a specific label cannot practically be performed in a mind of a human being.

In some embodiments, method 400 can optionally comprise activity 411 of determining a classifier score. In some embodiments, activity 410 can be performed as a part of and/or after activity 409. In various embodiments, a classifier score can comprise a probability of a data point (e.g., a match word, topic, or an image) falls within a class. In many embodiments, a classifier score can comprise a word-based classifier score. In these or other embodiments, a word-based classifier score can be determined by a word based classifier (e.g., a natural language classifier and/or a classifier as described in activity 409). In some embodiments, a classifier score can comprise an image based classifier score. The further embodiments, an image based classifier score can be determined by an image classifier. Generally speaking, an image classifier can be configured to classify an image into one or more classifications (e.g., to determine whether an image is conforming or non-conforming). A number of feature based image classification algorithms can be used to determine an image based classifier score. For example, a decision tree algorithm can be used. As another example, a bag-of-words model (e.g., a bag-of-visual-words model) can be used. Generally speaking, in a bag-of-words model an image is vectorized (i.e., converted into a vector) and then various natural language processing algorithms can be applied to the vector to classify the image. In many embodiments, a word based classifier score can be combined with an image based classifier score to create a hybrid score. In some embodiments, a different image classifier can be used for each non-conforming topic, match word, and/or phrase. In these embodiments, an image classifier can be trained on images associated with each non-conforming topic, match word, and/or phrase. Training an image classifier can be similar to training a classifier in activity 410, but can use various representations (e.g., an embedding) of images instead of labeled match words and/or topics. In further embodiments, a pre-trained image classifier can be used in activity 411. For example, Google Vision AI, which is maintained at https://cloud.google.com/vision, can be used.

In some embodiments, method 400 can optionally comprise activity 412 of removing non-conforming web text using the classifier. In many embodiments, non-conforming web text can be removed manually after presentation to a reviewer on a GUI (e.g., GUI 352 (FIG. 3)) and manual verification that text is non-conforming. In some embodiments, non-conforming web text can be automatically removed when one or more classifier scores are above or below a predetermined threshold. In many embodiments, web text removed in activity 411 can be the same or different from web text gathered in activity 401. In various embodiments, activity 411 can additionally comprise receiving one or more new web texts (e.g., web texts that have not been analyzed before by a classifier). In various embodiments, one or more of activities 402-407 can be repeated using the new web texts before scoring in activity 410.

In some embodiments, method 400 can optionally comprise activity 413 of displaying or facilitating displaying web text on a web page, which can be performed after activity 411 removes the non-conforming web text from the web text. As an example, the web page can be displayed on a GUI (i.e., GUI 350 (FIG. 3) on a computer (i.e., computer 330 (FIG. 3). In some embodiments, only conforming web text can be displayed in activity 412, while non-conforming web text is not displayed. In some embodiments, when non-conforming web text is discovered after being displayed, the website containing the non-conforming web text can be removed and replaced with conforming web text. For example, non-conforming web text can be obfuscated and/or replaced with conforming placeholder text. In some embodiments, non-conforming web text can be replace with a notice that the non-conforming web text has been removed and/or taken down. In various embodiments, non-conforming web text can be flagged and/or marked for removal. In these or other embodiments, flagged web text can be automatically removed prior to being displayed on a web site. In further embodiments, a reviewer GUI can be generated comprising flagged web text and a reviewer can decide whether or not to display the web text on a website.

Figure 5:
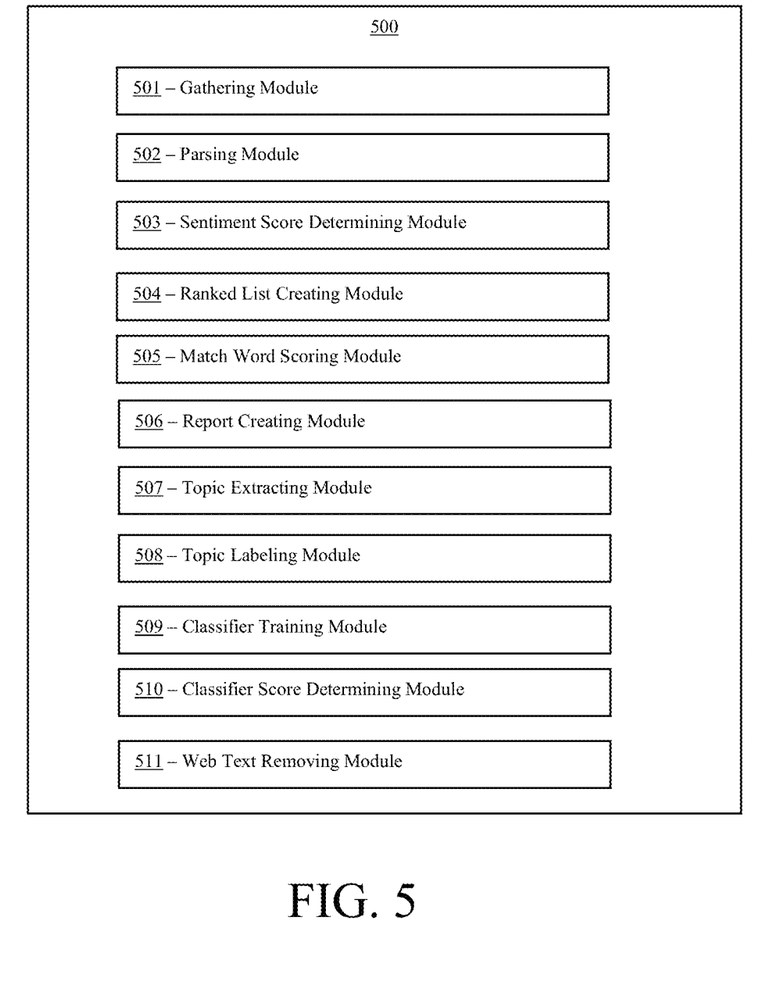
FIG. 5 illustrates a representative block diagram of a system, according to an additional embodiment.

Turning ahead in the drawings, FIG. 5 illustrates a block diagram of a system 500 that can be employed for removing non-conforming web text. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as gathering module 501. In many embodiments, gathering module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as parsing module 502. In many embodiments, parsing module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as sentiment score determining module 503. In many embodiments, sentiment score determining module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as ranked list creating module 504. In many embodiments, ranked list creating module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as match word scoring module 505. In many embodiments, match word scoring module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as report creating module 506. In many embodiments, report creating module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as topic extracting module 507. In many embodiments, topic extracting module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as new rule creating module 508. In many embodiments, topic labeling module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as match word labeling module 508. In many embodiments, match word labeling module 509 can store computing instructions configured to run on one or more processing modules and perform one or more acts of method 400 (FIG. 4) (e.g., activity 409 (FIG. 4)).

In many embodiments, system 500 can comprise non-transitory memory storage module 510. Memory storage module 510 can be referred to as classifier training module 510. In many embodiments, classifier training module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as classifier score determining module 511. In many embodiments, classifier score determining module 511 can store computing instructions configured to run on one or more processing modules and perform one or more acts of method 400 (FIG. 4) (e.g., activity 411 (FIG. 4)).

In many embodiments, system 500 can comprise non-transitory memory storage module 512. Memory storage module 512 can be referred to as web text removing module 512. In many embodiments, web text removing module 512 can store computing instructions configured to run on one or more processing modules and perform one or more acts of method 400 (FIG. 4) (e.g., activity 412 (FIG. 4)).

In many embodiments, system 500 can comprise non-transitory memory storage module 513. Memory storage module 513 can be referred to as web text displaying module 513. In many embodiments, web text displaying module 513 can store computing instructions configured to run on one or more processing modules and perform one or more acts of method 400 (FIG. 4) (e.g., activity 413 (FIG. 4)).

Although systems and methods for removing non-conforming web text have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform operations comprising:
   parsing one or more web texts;
   determining a respective web text sentiment score for each respective web text of the one or more web texts, as parsed;
   creating a ranked list of one or more match words in the one or more web texts;
   scoring the one or more match words in the ranked list of the one or more match words;

creating a report covering a predetermined period of time using the one or more match words, as scored, in the ranked list;

extracting one or more topics from the report covering the predetermined period of time;

labeling, using a generative model, the one or more match words to create labeled training data, wherein the generative model is configured to determine a distribution of each label among respective data points prior to assigning respective labels to respective training data;

training a word-based classifier using the labeled training data to identify non-conforming web text submitted to a website for display, wherein the one or more web texts comprises the non-conforming web text;

determining a word-based classifier score using the word-based classifier;

determining an image-based classifier score using an image-based classifier;

combining the word-based classifier score with the image-based classifier score to create a hybrid score; and automatically removing the non-conforming web text when at least one of the word-based classifier score, the image-based classifier score, or the hybrid score exceeds a predetermined threshold submitted to the website for display.

2. The system of claim 1, wherein creating the ranked list of the one or more match words comprises filtering out at least one web text of the one or more web texts when the respective web text sentiment score of the at least one web text is approximately zero.

3. The system of claim 1, wherein creating the ranked list of the one or more match words comprises ranking the one or more match words by their frequency of use.

4. The system of claim 1, wherein the computing instructions, when executed on the one or more processors, further cause the one or more processors to perform an operation comprising:

training the image-based classifier using embedded images submitted to the website for display to classify an image into at least one classification, wherein the at least one classification comprises a non-conforming image.

5. The system of claim 1, wherein scoring the one or more match words in the ranked list of the one or more match words comprises:

determining a respective score for each of the one or more match words, wherein the respective score comprises a compound sentiment score weighted by a number of mentions in the one or more web texts.

6. The system of claim 1, wherein extracting the one or more topics comprises:

using a term frequency-inverse document frequency algorithm to extract the one or more topics.

7. The system of claim 1, wherein extracting the one or more topics comprises:

using a non-negative matrix factorization algorithm to extract the one or more topics.

8. The system of claim 1, wherein extracting the one or more topics comprises:

using a latent dirichlet allocation algorithm to extract the one or more topics.

9. The system of claim 1, wherein parsing the one or more web texts comprises removing one or more of:

one or more stop words from the one or more web texts;
one or more HTML, tags from the one or more web texts;
whitespace from the one or more web texts; or
one or more punctuation marks from the one or more web texts.

10. The system of claim 1, wherein the one or more web texts comprise one or more of:

one or more RSS feeds;
one or more news articles; or
one or more social media posts.

11. A method implemented via execution of computing instructions configured to run at one or more processors and configured to be stored at non-transitory computer-readable media, the method comprising:

parsing one or more web texts;

determining a respective web text sentiment score for each respective web text of the one or more web texts, as parsed;

creating a ranked list of one or more match words in the one or more web texts;

scoring the one or more match words in the ranked list of the one or more match words;

creating a report covering a predetermined period of time using the one or more match words, as scored, in the ranked list;

extracting one or more topics from the report covering the predetermined period of time;

labeling, using a generative model, the one or more match words to create labeled training data, wherein the generative model is configured to determine a distribution of each label among respective data points prior to assigning respective labels to respective training data;

training a word-based classifier using the labeled training data to identify non-conforming web text submitted to a website for display, wherein the one or more web texts comprises the non-conforming web text;

determining a word-based classifier score using the word-based classifier;

determining an image-based classifier score using an image-based classifier;

combining the word-based classifier score with the image-based classifier score to create a hybrid score; and automatically removing the non-conforming web text when at least one of the word-based classifier score, the image-based classifier score, or the hybrid score exceeds a predetermined threshold submitted to the website for display.

12. The method of claim 11, wherein creating the ranked list of the one or more match words comprises filtering out at least one web text of the one or more web texts when the respective web text sentiment score of the at least one web text is approximately zero.

13. The method of claim 11, wherein creating the ranked list of the one or more match words comprises ranking the one or more match words by their frequency of use.

14. The method of claim 11 further comprising:

training the image-based classifier using embedded images submitted to the website for display to classify an image into at least one classification, wherein the at least one classification comprises a non-conforming image.

15. The method of claim 11, wherein scoring the one or more match words in the ranked list of the one or more match words comprises:

determining a respective score for each of the one or more match words, wherein the respective score comprises a compound sentiment score weighted by a number of mentions in the one or more web texts.

16. The method of claim 11, wherein extracting the one or more topics comprises:
using a term frequency-inverse document frequency algorithm to extract the one or more topics.

17. The method of claim 11, wherein extracting the one or more topics comprises:
using a non-negative matrix factorization algorithm to extract the one or more topics.

18. The method of claim 11, wherein extracting the one or more topics comprises:
using a latent dirichlet allocation algorithm to extract the one or more topics.

19. The method of claim 11, wherein parsing the one or more web texts comprises removing one or more of:
one or more stop words from the one or more web texts;
one or more HTML, tags from the one or more web texts;
whitespace from the one or more web texts; or
one or more punctuation marks from the one or more web texts.

20. The method of claim 11, wherein the one or more web texts comprise one or more of:
one or more RSS feeds;
one or more news articles; or
one or more social media posts.

* * * * *